Figure 18:
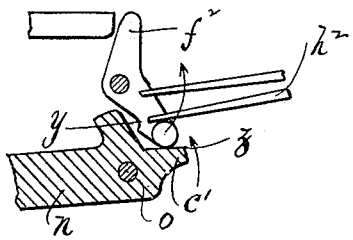

No. 845,481. PATENTED FEB. 26, 1907.
E. SANNER.
GUN.
APPLICATION FILED FEB. 21, 1905.
5 SHEETS—SHEET 1.
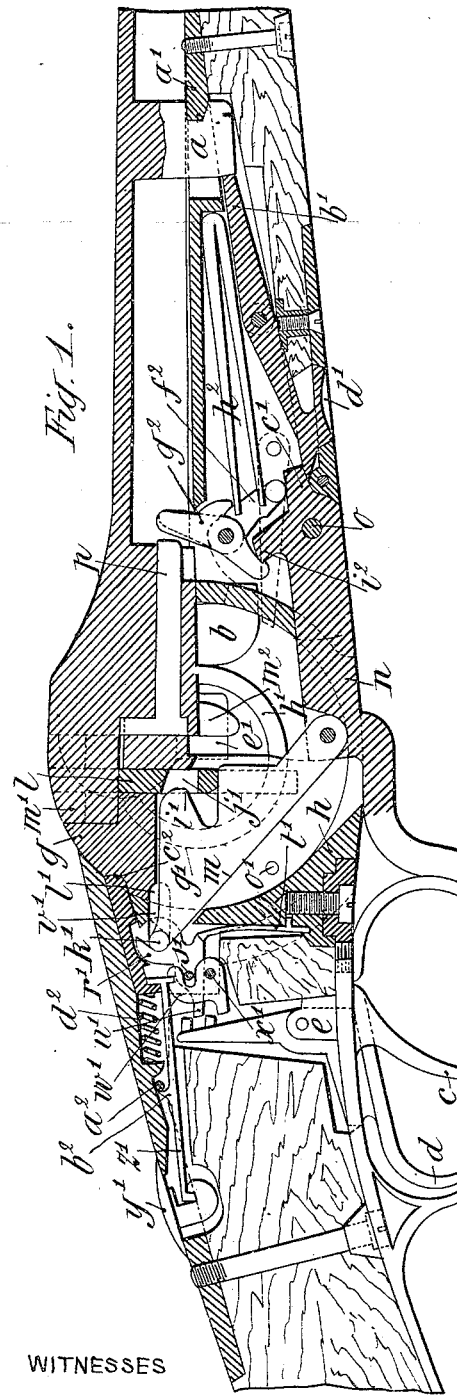
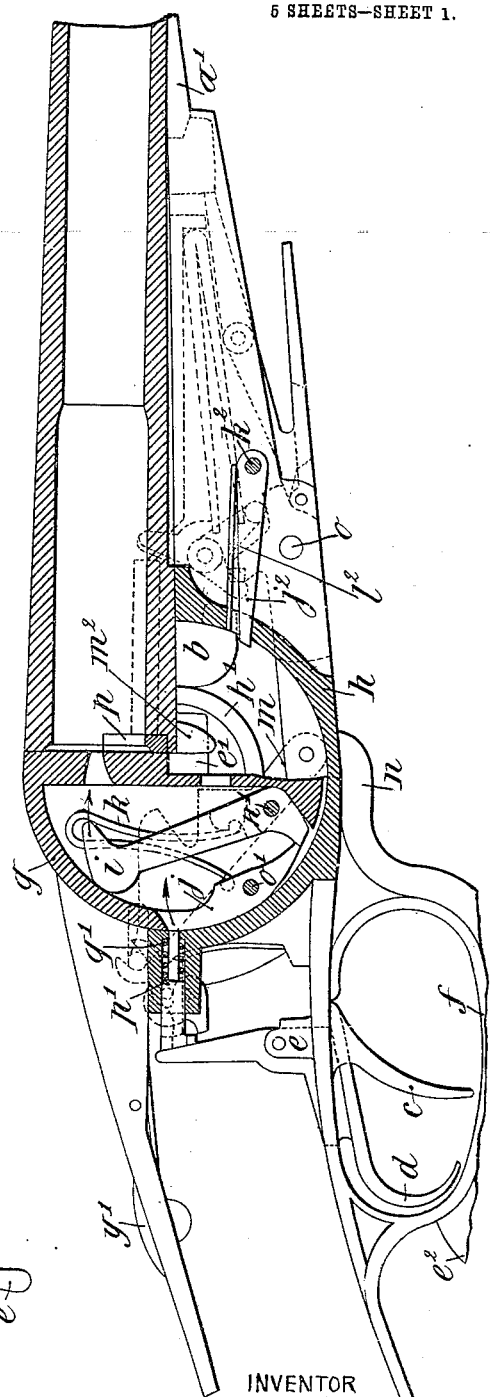
WITNESSES
Paul A. Blair
Walter Abbs
INVENTOR
Edouard Sanner
BY
Howson and Howson
ATTORNEYS No. 845,481. PATENTED FEB. 26, 1907.
E. SANNER.
GUN.
APPLICATION FILED FEB. 21, 1905.
5 SHEETS—SHEET 2.
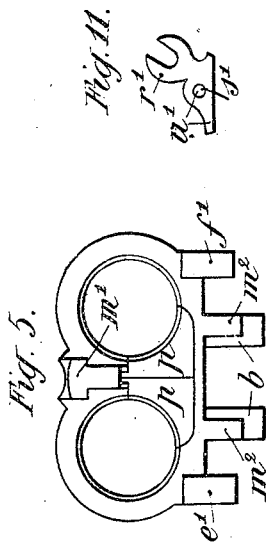
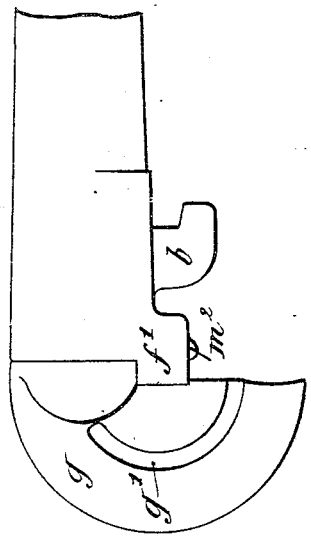
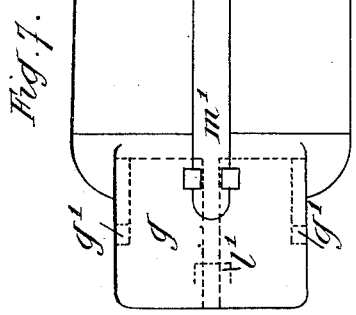
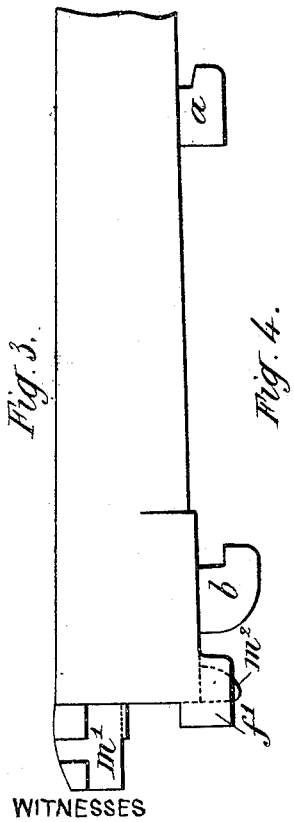
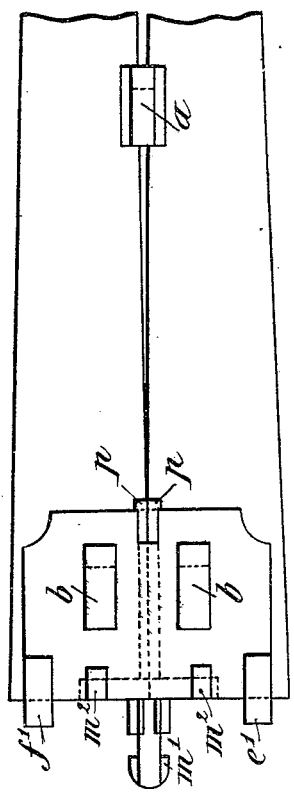
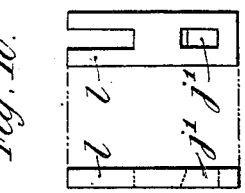
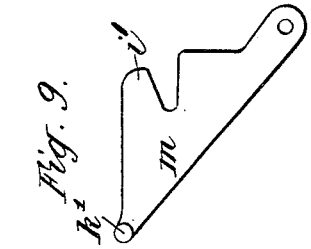
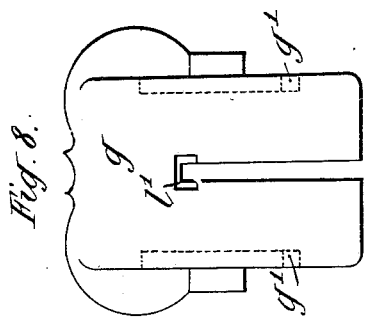
WITNESSES
Paul A. Blair
Walter Abb
INVENTOR
Édouard Sanner
BY Howson and Howson
ATTORNEY.

No. 845,481. PATENTED FEB. 26, 1907.
E. SANNER.
GUN.
APPLICATION FILED FEB. 21, 1905.
5 SHEETS—SHEET 3.
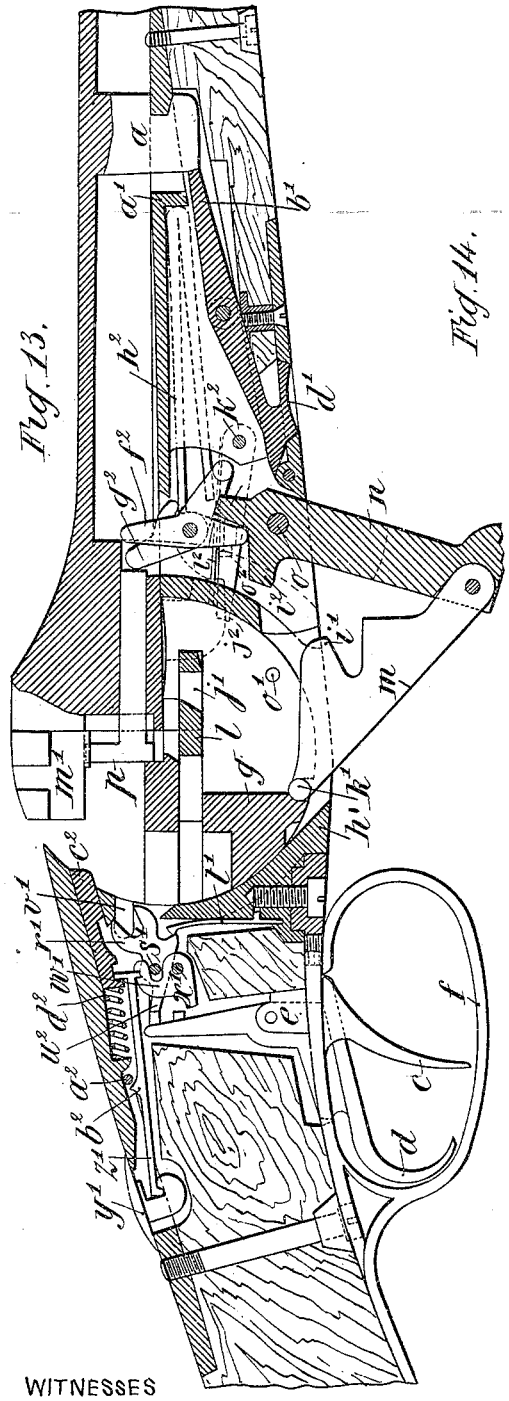
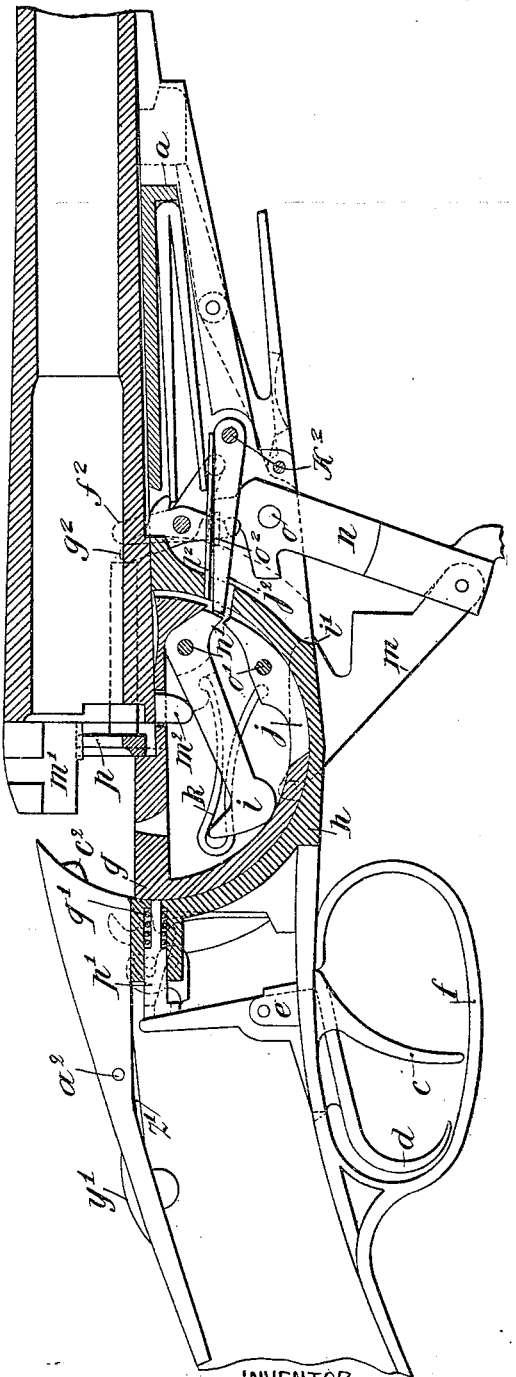
WITNESSES INVENTOR
Edouard Sanner
BY
Howson and Howson
ATTORNEYS

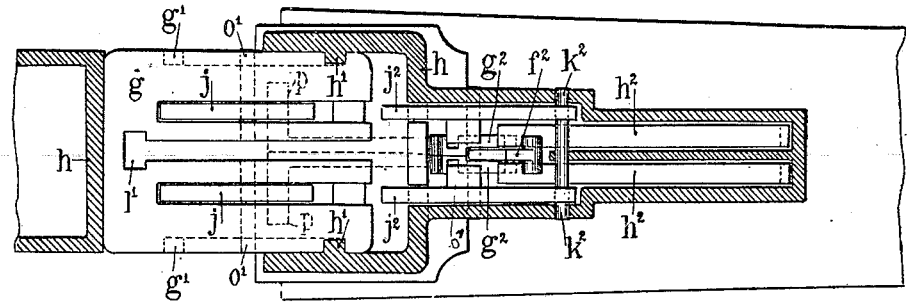
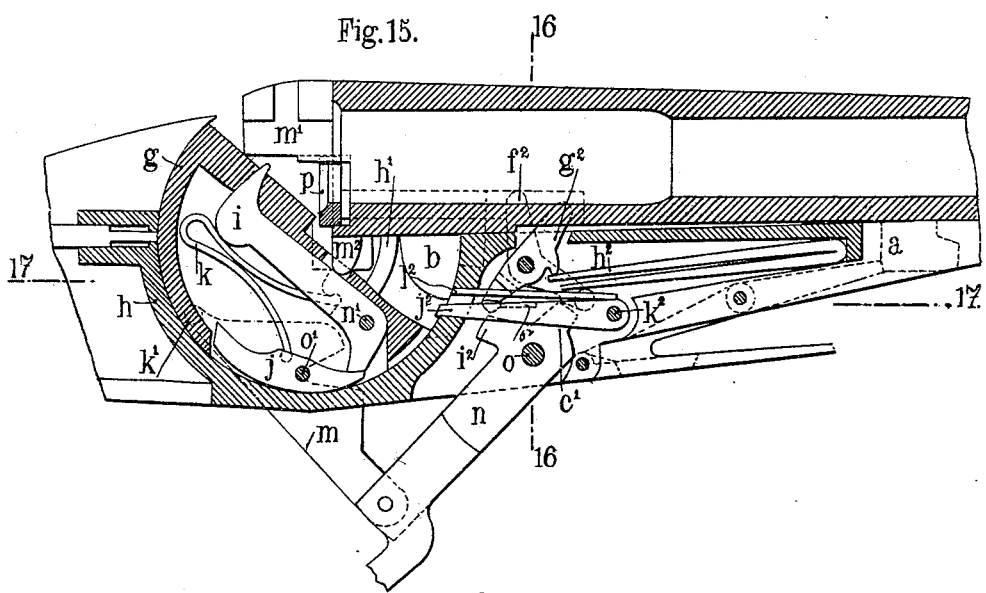
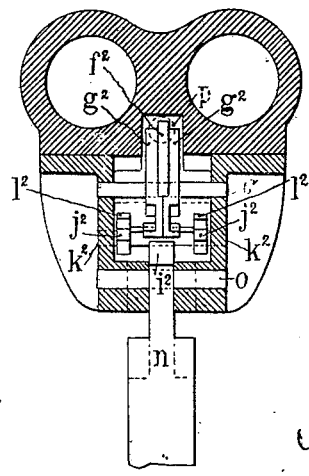

No. 845,481. PATENTED FEB. 26, 1907.
E. SANNER.
GUN.
APPLICATION FILED FEB. 21, 1905.

5 SHEETS—SHEET 5.

WITNESSES

INVENTOR
Edouard Sanner
BY

ATTORNEYS

UNITED STATES PATENT OFFICE.

EDOUARD SANNER, OF ST. ETIENNE, FRANCE.

GUN.

No. 845,481. Specification of Letters Patent. Patented Feb. 26, 1907.

Application filed February 21, 1905. Serial No. 246,676.

*To all whom it may concern:*

Be it known that I, EDOUARD SANNER, a citizen of the Republic of France, and residing in St. Etienne, Loire, France, have invented certain new and useful Improvements in Guns, of which the following is a specification.

This invention has reference to small-arms of the kind in which the barrels are fixed, and has for its object to insure their effective operation and safety. A shot-gun provided with a fixed barrel and comprising these improvements is represented in the accompanying drawing, although the same principle may easily be applied to a rifle or other style of gun.

In the accompanying drawings, Figure 1 is a longitudinal section along the axis of the gun between its two barrels. Fig. 2 is a longitudinal section along the axis of one of the barrels. Fig. 3 is a longitudinal elevation. Fig. 4 is a corresponding plan view as seen from below. Fig. 5 is an end view showing the barrels separate from the stock. Figs. 6, 7, and 8 are views similar to the foregoing but more particularly representing the breech-block of the barrels. Fig. 9 shows separately the link of the breech-block. Fig. 10 shows separately the locking-bolt. Figs. 11 and 12 show separately two safety parts of the gun. Figs. 13, 14, and 15 are views corresponding to Figs. 1 and 2 and serve to assist in explaining the operation. Fig. 16 is a transverse view on the line 16 16 of Fig. 15. Fig. 17 is a horizontal section on the line 17 17 of Fig. 15. Fig. 18 is a detail of the ejector mechanism.

The gun with fixed barrels, as shown in Figs. 1 and 2, comprises two barrels arranged side by side and engaged at $a$ and $b$ upon a stock provided with two triggers $c$ and $d$, pivoted upon a trigger-plate $e$ and protected by a trigger-guard $f$. Behind the barrels is situated a breech-block $g$, arranged in such a manner as to be capable of rotating in a cylindrical cavity formed transversely at the rear of the barrels and constituting the breech-casing $h$. This breech-block, acting as a movable breech, comprises the percussion members (hammers $i$, sears $j$, and spring $k$) for each of the barrels, Fig. 2, and between these members, Fig. 1, locking-bolt $l$ and a link $m$, which by the intermediary of a rocking lever $n$, pivoted at $o$, acts simultaneously upon the bolt $l$ and upon the breech-block $g$, as is hereinafter explained. The gun comprises in addition two extractor-ejectors $p$ and $p$, submitted to the action of the rocking lever $n$ and acting, respectively, upon each of the cartridges or cases which are contained in the barrels for the purpose of ejecting them. It likewise comprises a safety device which is at the disposal of the user of the gun, and which is also adapted to be automatically acted upon by the link both upon the closing and the opening of the barrels, and which is such that the triggers are unable to act unless the block $g$ occupies its closed position and the user desires to fire. Having given this general explanation, the details of each of the constituent parts that have been enumerated are now given.

The locking of $a$ is obtained, Fig. 1, by means of a latch engaged in a mortise formed in the front of a metal plate $a'$, rigidly fixed to the gun. This latch is maintained in position by a lever $b'$, the front extremity of which acts upon the said latch when its rear extremity is engaged and maintained by a nose $c'$ of the lever $n$. In order to permit of the release of the latch in question, it is only necessary to rock the lever $b'$ by pressing with the finger upon the stud $d'$, projecting from the lower part of stock.

The locking of $b$ is effected, Figs. 1 and 2, by two latches, Figs. 3, 4, and 5, engaging, respectively, in mortises formed in the wall of the breech-chamber $h$. The engagements $a$ and $b$ are completed by noses $e'$ and $f'$ on the rear of the barrels and bearing upon each side of the breech-casing $h$.

The breech-block $g$, Figs. 1, 2, 6, 7, and 8, intended to rotate in the said breech-chamber $h$, is provided upon both sides with circular grooves $g'$, in which engage protuberances $h'$ of the same kind formed in the breech-casing $h$ and serving for the guidance of the block $g$. The link $m$, pivoted upon the operating-lever $n$, is provided with a latch $i'$, Figs. 1 and 9, which when the breech is closed is situated opposite a mortise $j'$, formed in the locking-bolt $l$. The link is also provided with a nose $k'$ of T shape intended when the rocking lever $n$ is operated to engage in a recess $l'$, formed in the periphery of the block $g$, which is suitably slotted, Figs. 1 and 8, for the passage of the said link.

The bolt $l$ is formed of a fork the arms of which, Figs. 1 and 10, engage between reinforcements formed upon the prolongation $m'$ of the strip comprised between the two barrels, while the body of the said bolt itself works in a mortise formed in the breech-block.

The striking-hammers $i$ $i$ rock at $n'$, Fig. 2, upon a spindle solid with the block $g$. They are maintained cocked by the nose of the corresponding sears $j$ $j$, which likewise rock upon a spindle $o'$, solid with the block $g$. Opposite to each sear is situated, Fig. 2, a rod $p'$, submitted to the action of an antagonistic spring $q'$ and upon which the corresponding trigger is able to press for the purpose of rendering the said sear displaceable and of releasing its hammer, which, under the influence of the spring $k$, strikes the corresponding cartridge. It should, however, be noticed that the action of the triggers cannot be exerted unless the block $g$ completely obturates the barrels. To this end a part $r'$, Figs. 1 and 11, rocking at $s'$ and submitted to the action of a spring $t'$, presents its nose $u'$ to the triggers $c$ and $d$ when the breech is open, Fig. 13, or incompletely closed; but this part releases the triggers when the closing is complete—that is to say, when the nose $k'$ of the link $m$, completely engaged in the recess $l'$ of the breech-chamber $h$, has caused the part $r'$ to rock, Fig. 1, in such a manner as to release the triggers. It will be noticed that the spring $t'$ maintains the part $r'$ in each of its positions, and when the gun is opened the nose $k'$ of the link acts upon the lower arm of this part, while when the gun is closed it acts upon the upper arm. Another part $w'$, rocking at $x'$, Figs. 1 and 12, may likewise be arranged across the triggers $c$ and $d$, so as to oppose their operation, with this difference, that it is rendered available for marksmen by means of a stud $y'$, which is connected therewith by a rod $z'$. When the stud in question is at the rear, Fig. 1, the triggers are released. When, in the contrary, it is pressed forward, the rod $z'$ rocks the part $w'$ and places the triggers at safety. The rear and forward positions of the rod $z'$ are assured by a small stop $a^2$, which a nose $b^2$ of the said rod is obliged to pass in proceeding from one position to the other.

The rod $z'$ is combined with a bolt $c^2$, submitted to the action of a spring $d^2$, Fig. 1, which in its normal position locks the breech-block $g$ by engaging in a notch formed in the periphery of this latter. In the operations of opening and closing the breech the bolt $c^2$ yields of itself, compressing the spring $d^2$, which then reacts so as to again bring it into position. When it is desired to withdraw the block $g$, so as to dismount the gun, however, it is only necessary to draw back the safety-stud $y'$ in order that the bolt $c^2$, participating in the movement, may release the block $g$ and permit of the withdrawal from above when the barrels have been removed. In any case the opening of the breech is caused by the operation of the rocking lever $m$, which the marksman seizes by its projection $e^2$ and causes it to rock, Fig. 13, around the pivot $o$. This rocking lever displaces with it the link $m$, the nose of which first acts upon the safety part $r'$, as already explained, and lodges in the notch $l'$ of the block at the same time that its latch $i'$ engages in the mortise $j'$ of the breech-bolt, the said link exerting traction upon this latter, so as to release it, and carrying with it the breech-block, which rotates upon itself in such a manner as to uncover the opening of the barrels, Fig. 14.

The opening of the breech is utilized for operating the mechanism for extracting and ejecting the unfired cartridges. This mechanism is constituted, Figs. 1, 15, 16, and 17, by a lever $f^2$ and the two other levers $g^2$ $g^2$, all three freely mounted upon the same pivot. The lever $f^2$ is situated between the levers $g^2$ $g^2$. They are respectively acted upon by the springs $h^2$ $h^2$ with their lower legs bearing in lateral projections on the arms of the lever $f^2$. These springs $h^2$ $h^2$ tend constantly to separate the levers $g^2$ $g^2$ from the lever $f^2$. The lower arm of the lever $f^2$ strikes against the nose $c'$ of the rocking lever $n$, and those of the levers $g^2$ $g^2$ strike against the counter-nose $i^2$ of this latter. The nose $c'$ of the lever $n$ acts upon the lever $f^2$ by its plane surface $z$, Fig. 18, over which the end of the lever $f^2$ slides. If that plane surface were radial to the center $o$, it might not act; but it is tangential to a circle drawn from the center $o$, and therefore acts as a cam. The spring $h^2$ is compressed, but not sufficiently to make the parts bind. As soon as the end of the lever $f^2$ is past the surface $z$ the spring $h^2$ forces the end of the lever against the end and down the other side to the nose $c'$. The cut $y$ in the side of the lever $f^2$ prevents the nose $c'$ from binding the lever $n$ as it revolves further. The upper arms of the levers $f^2$ and $g^2$ are side by side, Fig. 16, and situated opposite the rod of the extractor-ejectors $p$ $p$, which surround particularly the rims of the cartridges upon the sides adjacent to the aperture of the barrels. The mechanism in question also comprises two levers $j^2$ $j^2$, Figs. 2, 15, 16, and 17, pivoted at $k^2$ and each submitted to the action of the spring $l^2$ $l^2$. The said levers are intended to maintain in position at a given moment, by means of the lateral projections $o^2$ which they carry, the levers $g^2$ $g^2$, and their free extremities are engaged in the breech-chamber in such a manner that they extend into the path followed by hammers $i$ $i$.

During the operation of the breech the finger $i^2$ leaves the levers $g'$ $g^2$, which come to bear on the lateral projections $o^2$, Fig. 15, of the levers $j^2$ at the same time that the nose $c'$ of the rocking lever acts upon the lever $f^2$, which rocks slightly and displaces by some millimeters, Fig. 15, the extractor-ejectors $p$ $p$ in such a manner that they pull on the rims of the cartridges and effect the extraction. The springs $h^2 h^2$ are then compressed in such a manner that the second levers $g^2 g^2$ are maintained by the levers $j^2 j^2$. Toward the end of the operation of opening the breech the hammers press upon these latter levers, which then release the lever $g^2$, which upon the reaction of the springs $h^2 h^2$, respectively strike vigorously against the extractor-ejector $p$ $p$, so as to effect the ejection, Fig 13. It will also be noticed that likewise toward the end of the opening operation noses $m^2$, solid with the barrels, enter the block $g^2$ through appropriate openings and press upon the hammers situated therein, Fig. 14, so as to bring them into the cocked position in which they are assured by sears, as above stated. It might also be noted that the rocking lever $n$ is maintained in the open position by the engagement of its nose $c'$ with the lever $f^2$, submitted to the action of the springs $h^2 h^2$. In these conditions it is only necessary to insert fresh cartridges in the barrels and also to close the breech by moving back the rocking lever $n$ into contact with the trigger-guard in order to render the gun ready for firing. The firing cannot, however, actually take place unless the closing is complete, as has already been explained, and unless the safety-stud $y'$ is situated at the rear.

I claim as my invention—

1. A breech mechanism comprising a rotary breech-block placed transversely behind the barrels, hammers inclosed within said block, and means at the end of the barrel adapted to enter an appropriate opening in the block for automatically cocking the hammers when the block is opened.

2. A breech mechanism comprising a rotary breech-block placed transversely behind the barrels, hammers inclosed within said block, triggers for releasing the hammers, means for rotating the block and means operated thereby for locking the triggers while the breech is open and for releasing the same upon the closing of the breech.

3. A breech mechanism comprising a rotary breech-block placed transversely behind the barrels, hammers inclosed within said block, triggers for releasing the hammers, means for rotating the block and a safety spring-bolt operated thereby which locks the triggers while the breech is open and releases the same when the breech is closed.

4. A breech mechanism comprising a rotary breech-block placed transversely behind the barrels, hammers inclosed within said block, triggers for releasing the hammers, a lever for rotating the block, a link operated by said lever, a projection on said link, and a pivoted safety-catch provided with a projection adapted to engage the triggers on rotation of the catch and also with a forked projection adapted to receive the projection on said link, whereby on opening the breech said safety-bolt is brought into engagement with the triggers and is released from such engagement upon closing the breech.

5. A breech mechanism comprising a rotary breech-block placed transversely behind the barrels, hammers inclosed within said block, triggers for releasing said hammers, means to rotate the block, means operated thereby to lock the triggers while the breech is open and for releasing the same upon the closing of the breech in combination with a safety-stud independently operated.

6. A breech mechanism comprising a rotary breech-block, a rocking lever and means to operate the same, in combination with an automatic ejecting device consisting in an ejecting-pin, two sets of levers acting thereupon actuated by the rocking lever, a spring acting upon said levers to force them in opposite directions, a spring-actuated catch in connection with one set of said levers, and means to free said spring-actuated catch, substantially as described.

In testimony whereof I have signed my name to this specification in the presence of two subscribing witnesses.

EDOUARD SANNER.

Witnesses:
 JEAN CREMERIEUX,
 JACQUES EINARD.